Patented Dec. 28, 1948

2,457,674

UNITED STATES PATENT OFFICE 2,457,674

FUNGICIDAL COMPOSITIONS

John W. Heuberger, Newark, Del., assignor to Röhm & Haas Company, Philadelphia, Pa., a corporation of Delaware No Drawing. Application December 2, 1944, Serial No. 566,395

5 Claims. (Cl. 167—22)

This invention relates to agricultural fungicidal compositions and particularly to a fungicidal composition obtained by mixing a dithiocarbamate with zinc oxide or with materials which, when placed in an aqueous solution, produce zinc hydroxide, such as a soluble zinc salt and lime.

It has heretofore been known that dithiocarbamates have fungicidal activity and may be used on living plants to control injury from fungus diseases. The fungicidal value of such compounds has not, however, been sufficient to constitute a practical improvement over the copper compounds now commonly used as agricultural fungicides.

It has also been proposed in agricultural sprays to use the flocculent precipitate that is obtained by adding lime and a soluble salt of such metals as zinc, manganese, or aluminum to an aqueous solution or suspension of an insecticidal or a fungicidal material to aid the adherence of the sprayed material to the foliage of plants. Such uses of zinc salts and lime have the mechanical effect of improving the sticking of the fungicide and do not increase fungicidal activity.

The object of this invention is to provide an improved agricultural fungicide that avoids the use of copper and which affords equivalent or substantially better protection than that obtained by fungicides based on copper.

Another object of this invention is to provide an efficient complete fungicidal preparation that does not require mixing with materials other than water when placed in the spray tank.

These objects are attained through the discovery that, by mixing a dithiocarbamate with zinc oxide or with lime and a soluble salt of zinc, a fungicidal composition is obtained which is not only superior to the dithiocarbamates when used alone but provides better protection and larger yields of crops than is obtainable with copper fungicides either when used alone or when used in conjunction with zinc sulfate and lime. It has also been observed that the foliage of plants treated with the combination are softer and healthier than the foliage of plants treated with copper sprays. The combination seems not only to destroy fungus diseases but, in addition, to stimulate plant growth.

The dithiocarbamates that may be used in the combination are the salts of dithiocarbamic acids having the formula

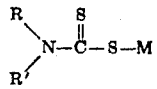

wherein R represents an organic group, R' represents hydrogen or an organic group, and M represents a salt-forming group. The organic groups in these compounds may be acyclic, alicyclic, or aromatic, or R and R' together with the nitrogen may form a heterocycle. The salt-forming groups may be a metal, an amine, or a quaternary ammonium group. The dithiocarbamates may be soluble in water, such as the sodium, potassium, and calcium salts and some of the amine and quaternary ammonium salts, or they may be insoluble or relatively insoluble, such as the copper, iron, zinc, and cadmium salts. The dithiocarbamate portion of these compounds may be obtained by the well known reaction of carbon disulfide upon amines, and the amines used may be primary or secondary, monoamine or polyamine, aliphatic, aromatic, heterocyclic, or alicyclic. Typical amines that may be used are monomethylamine, dimethylamine, cyclohexylamine, dicyclohexylamine, monoethylamine, diethylamine, ethylene diamine, propylene diamine, diethylene triamine, piperidine, piperazine, paraphenylene diamine, benzylamine, benzlymethylamine, phenylmethylamine, aniline, and similarly constituted amines. Compounds having a relatively low ratio of carbon atoms to dithiocarbamate groups are preferred, particularly the aliphatic dithiocarbamates such as mono- and di-methyl dithiocarbamate, mono- and di-ethyl dithiocarbamate, and ethylene bis-dithiocarbamate. Of particular value are the polydithiocarbamates of aliphatic polyamines such as ethylene and similar alkylene bisdithiocarbamates.

Of the soluble zinc salts, the sulfate is preferred but other soluble salts, such as the chloride or nitrate, may be used.

In the preparation of the fungicidal composition, the components may be mixed in the dry state and thus simultaneously added to water in the preparation of the spray, or the materials may be individually added to the water and mixed therein. The ratio of each ingredient in the mixture may be varied considerably and an excessive quantity of any one is more wasteful of that ingredient than detrimental to the desired result. Very good results are obtained when one and one-half pounds of the dithiocarbamate are mixed with one pound of commercial zinc sulfate and one-half pound of lime and the mixture used in the production of 100 gallons of spray. The dithiocarbamate may, however, be reduced to one-half pound or increased to four pounds. The zinc sulfate, also, may be reduced to as little as one-eighth pound and the lime to one-sixteenth pound per one and one-half pounds of dithiocarbamate and, while such mixtures appear to be less effective in some respects than the preferred 50:33:17% ratio, they give substantially better results than the dithiocarbamate used alone.

When zinc oxide is used in the combination, one pound of oxide and two pounds of dithiocarbamate have been found very effective in 100 gallons of spray, but the best ratio and dilution to use may depend upon the particular circumstances.

The following examples are given to illustrate the practice of the invention and the results obtainable by its use. The dithiocarbamate used in these tests is disodium ethylene bisdithiocarbamate.

EXAMPLE 1

CONTROL OF EARLY BLIGHT ON POTATOES

In a replicated randomized block experiment small plots of potatoes were given seven applications of the fungicidal preparations indicated in Table I. The applications were made at approximately ten-day intervals over a period beginning when the plants were 8–10 inches high and continuing until the potato foliage died down normally. Spraying was done with a knapsack sprayer at the rate of 200 gallons per acre. No late blight appeared during the season but early blight was destructive.

Table I

| Material (lbs./100 gals. of spray) | Per cent Control of Early Blight app. 3 wks. after final application | Average Yield, Bu./Acre | | | |
|---|---|---|---|---|---|
| | | #1 | #2 | Culls | Total |
| Yellow cuprous oxide, 1.9 | 60 | 69.59 | 73.96 | 23.54 | 167.09 |
| Yellow cuprous oxide, 1.9<br>Zinc sulfate, 1<br>Lime, ½ | 85 | 73.96 | 71.88 | 28.13 | 173.97 |
| Dithiocarbamate, 1.8 | 5 | 54.59 | 63.75 | 35.63 | 153.97 |
| Dithiocarbamate, 1.8<br>Zinc sulfate, 1<br>Lime, ½ | 90 | 107.71 | 89.80 | 22.09 | 219.60 |
| Check (unsprayed) | 0 | 15.63 | 43.55 | 28.12 | 87.30 |

EXAMPLE 2

CONTROL OF LATE BLIGHT ON POTATOES

Test plots of potatoes replicated four times were sprayed with the materials indicated in Table II. Applications were made at the rate of approximately 125 gals. per acre and at weekly intervals except when weather was favorable for blight in which period applications were made every four or five days. A total of twelve applications were made. The results of the tests are shown in Table II.

Table II

| Material (lbs./100 gals. of spray) | Per cent Leaves dead from Late Blight at Four Reading Dates | | | | Average Yield, Bu./Acre |
|---|---|---|---|---|---|
| | 1st | 2nd | 3rd | 4th | |
| Check (unsprayed) | 81.1 | 96.2 | 100 | 100 | 142.68 |
| Dithiocarbamate, 2<br>Zinc sulfate, 1<br>Lime, ½ | 3.4 | 9.5 | 22 | 75 | 223.17 |
| Dithiocarbamate, 1<br>Zinc sulfate, 1<br>Lime, ½ | 12.1 | 17.0 | 56 | 80 | 204.88 |
| Dithiocarbamate, ½<br>Zinc sulfate, 1<br>Lime, ½ | 18.3 | 35.2 | 79 | 94 | 201.22 |
| Yellow cuprous oxide, 1½<br>Zinc sulfate, 1<br>Lime, ½ | 3.4 | 37.0 | 81 | 100 | 186.58 |
| Yellow cuprous oxide, 1½ | 8.3 | 32.7 | 88 | 100 | 188.41 |
| Dithiocarbamate, 1 | 23.1 | 64.2 | 85 | 100 | 173.77 |
| Dithiocarbamate, 2 | 13.3 | 52.2 | 85 | 100 | 164.62 |
| Dithiocarbamate, ½ | 53.7 | 69.5 | 87 | 100 | 150.00 |

EXAMPLE 3

CONTROL OF BLIGHT ON TOMATOES

Test plots of tomatoes replicated three times were treated with the materials indicated in Table III. A total of seven applications were made at approximately weekly intervals. When the plants were young, applications were made at the rate of 50–60 gallons per acre but were increased to approximately 130 gallons per acre as the plants grew. Late blight was present during the early stages of the test but was replaced by Alternaria leaf spot after the weather became hot. Checks for the amount of disease were made by the scale of 0–10. In the determination of yield, only marketable tomatoes of Grade U. S. #1 and U. S. #2 were considered. Results of the test are given in the following table.

Table III

| Material (lbs./100 gals. of spray) | Diseased Foliage at Four Reading Dates | | | | Average Yield, Bu./Acre |
|---|---|---|---|---|---|
| | 1st | 2nd | 3rd | 4th | |
| Check | 6.25 | 7.00 | 7.00 | 8.20 | 228.02 |
| Dithiocarbamate, 2<br>Zinc sulfate, 1<br>Lime, ½ | 1.66 | 1.70 | 2.11 | 3.10 | 382.28 |
| Dithiocarbamate, 4<br>Zinc sulfate, 1<br>Lime, ½ | 1.08 | 1.90 | 2.12 | 3.50 | 359.25 |
| Dithiocarbamate, 2<br>Zinc sulfate, 1 | 1.58 | 2.00 | 2.50 | 2.90 | 294.25 |
| Dithiocarbamate, 2<br>Lime, ½ | 2.33 | 3.40 | 4.20 | 5.30 | 287.55 |
| Dithiocarbamate, 2 | 3.33 | 4.60 | 5.00 | 5.30 | 277.49 |
| Dithiocarbamate, 2<br>Zinc sulfate, ½<br>Lime, ⅛ | 1.42 | 1.50 | 3.12 | 4.00 | 322.76 |

During these tests it was noticed that the sprayed plants remained free of aphis while a moderately heavy infestation which made necessary two applications of an Aphicide built up in nearby plots.

EXAMPLE 4

In a test to compare the efficiency of zinc oxide in the combination in place of zinc sulfate and lime, test plots of potatoes were treated with the sprays indicated in Table IV, and after five applications at approximately weekly intervals the plants were rated by the scale of 0–10 on the amount of injury from both early and late blight. Readings were made on 100 plants in each test and averaged.

Table IV

| Material (lbs./100 gals. of spray) | Late Blight | Early Blight |
|---|---|---|
| Dithiocarbamate, 2<br>Zinc sulfate, 1<br>Lime, ½ | 2.0 | 0.8 |
| Dithiocarbamate, 2<br>Zinc oxide, 1 | 2.1 | 1.1 |
| Dithiocarbamate, 2 | 3.6 | 2.0 |
| Copper fungicide (check) | 4.5 | 2.1 |

I claim:

1. A fungicidal composition adapted for agricultural use comprising a water-soluble salt of an alkylene bisdithiocarbamic acid, a water-soluble salt of zinc, and lime.

2. A fungicidal composition adapted for agricultural use comprising a water-soluble sodium salt of an alkylene bisdithiocarbamic acid, a water-soluble salt of zinc, and lime.

3. A fungicidal composition adapted for agricultural use comprising a mixture of disodium ethylene bisdithiocarbamate, zinc sulfate, and lime.

4. A fungicidal composition adapted for agricultural use comprising from 16 to 32 parts of a water-soluble salt of an alkylene bisdithiocarbamic acid, from 2 to 16 parts of zinc sulfate, and from 1 to 8 parts of lime.

5. A fungicidal composition adapted for agricultural use comprising from 16 to 32 parts of disodium ethylene bisdithiocarbamate, from 2 to 16 parts of zinc sulfate, and from 1 to 8 parts of lime.

JOHN W. HEUBERGER.

REFERENCES CITED

The following references are of record in the file of this patent:

UNITED STATES PATENTS

| Number | Name | Date |
|---|---|---|
| 1,791,430 | Roberts | Feb. 3, 1931 |
| 1,972,961 | Tisdale et al. | Sept. 11, 1934 |
| 2,281,735 | Wieder | May 5, 1942 |
| 2,290,235 | Guy | July 21, 1942 |
| 2,317,765 | Hester | Apr. 27, 1943 |
| 2,325,720 | Urbschat et al. | Aug. 3, 1943 |